J. T. TENNEFASS.
POTATO CUTTER.
APPLICATION FILED APR. 7, 1916.

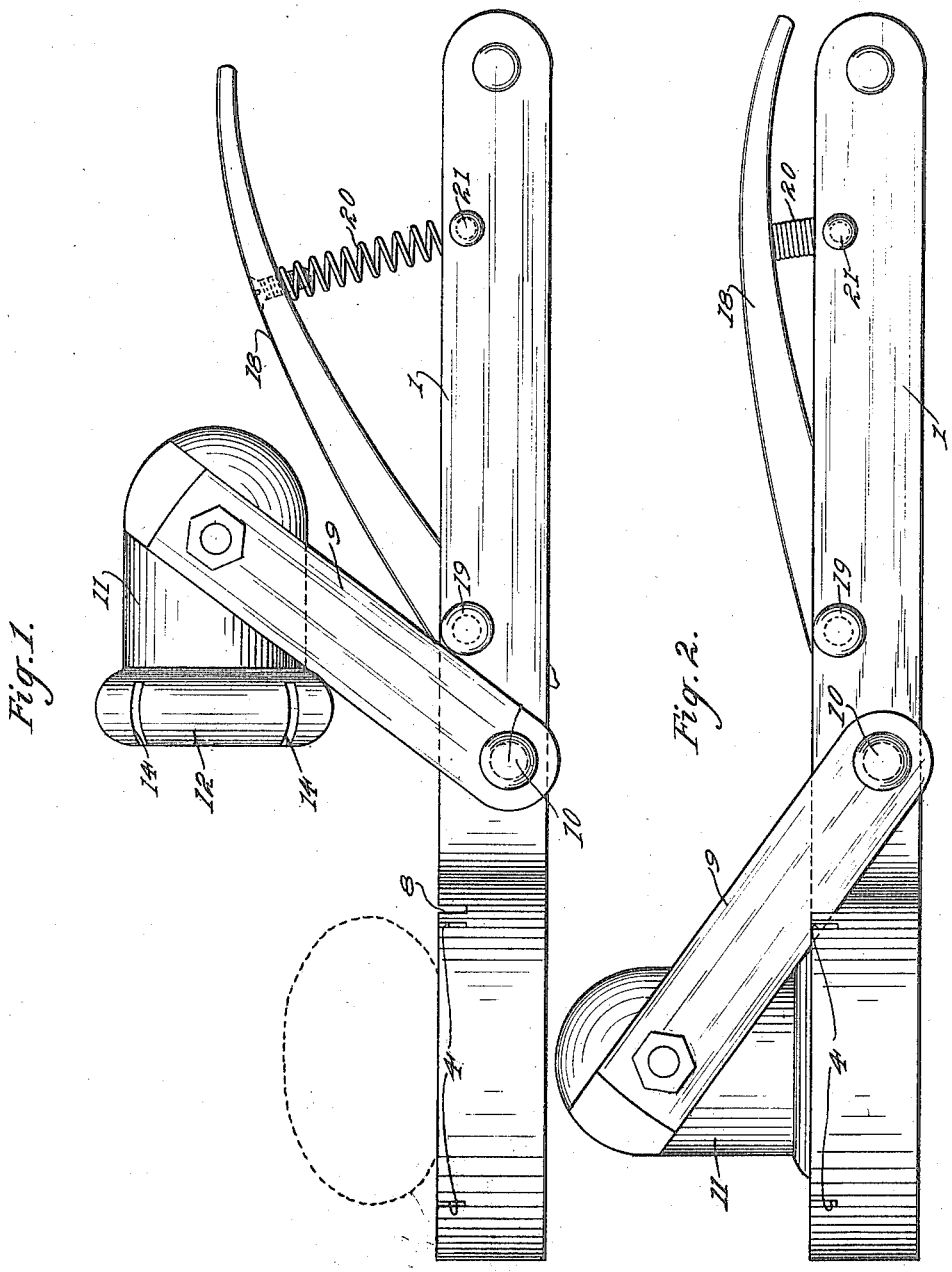

1,263,483.

Patented Apr. 23, 1918.
2 SHEETS—SHEET 2.

Witnesses
Paul A. Viersen
Grace C. Thompson

Inventor
J. T. Tennefass
H. J. Sanders
By                    Atty.

UNITED STATES PATENT OFFICE.

JENS T. TENNEFASS, OF MOORHEAD, MINNESOTA.

POTATO-CUTTER.

1,263,483.　　　　　　Specification of Letters Patent.　　Patented Apr. 23, 1918.

Application filed April 7, 1916.　Serial No. 89,673.

*To all whom it may concern:*

Be it known that I, JENS T. TENNEFASS, a citizen of Norway, residing at Moorhead, in the county of Clay and State of Minnesota, have invented certain new and useful Improvements in Potato-Cutters, of which the following is a specification.

This invention relates to improvements in potato cutters or quarterers and one object is to produce a device that is very serviceable for quartering seed potatoes. Another object is to produce a device of this class that is simple in construction, efficient in operation and cheap to manufacture. With the foregoing and other objects in view the invention consists in the combination and arrangement of parts to be hereinafter fully described in this specification, pointed out in the appended claim and illustrated in the accompanying drawings which form a part of said specification and in which—

Figure 1 is a side elevation of my improved device.

Fig. 2 is a similar view of the same in altered position.

Like reference characters denote corresponding parts throughout the several views.

Figure 3:
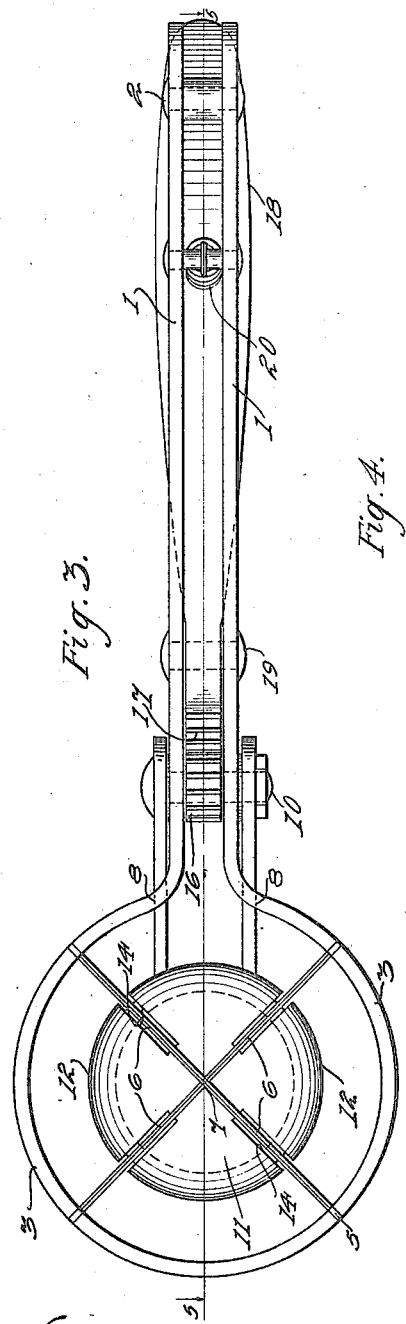
Fig. 3 is an inverted plan view of the device.
Figure 4:
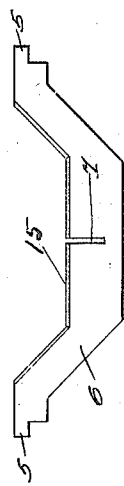
Fig. 4 is a fragmentary view of the knife employed.
Figure 5:
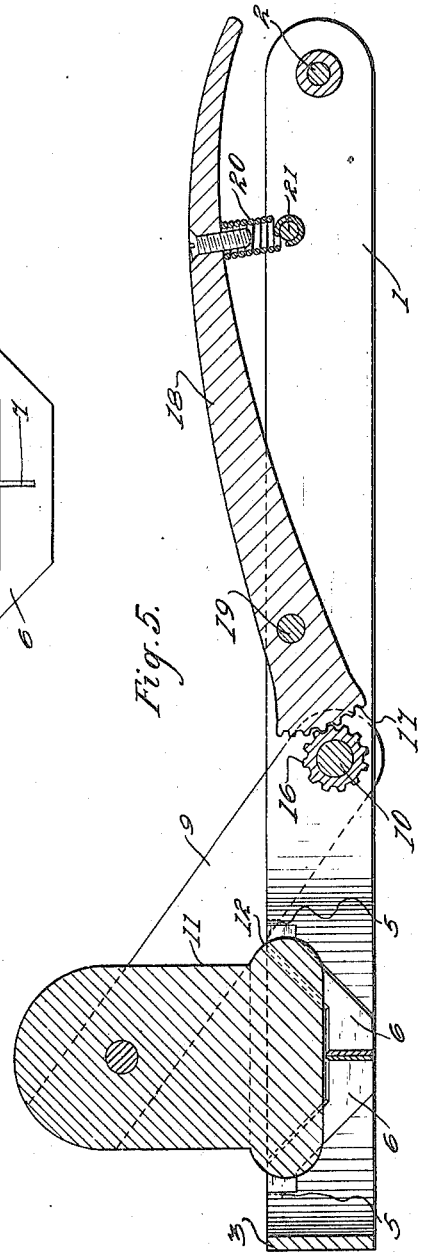
Fig. 5 is a longitudinal sectional view taken on line 5—5 of Fig. 3.

The numeral 1 denotes the frame of the potato cutter which is formed of a single piece of material having its sides parallel, to form a handle, and connected together at one end by a spacer bolt 2 and its opposite end bent into approximately circular shape as at 3 and formed with the equidistant notches 4 adapted to receive the ends 5 of the blades 6, 6 which form the knife. One blade 6 is formed with a notch 7 to receive the other blade which is disposed at right angles to the first named blade as clearly shown in Fig. 3 and both blades are depressed or bent downward centrally to form a seat for the potato. The circular end of the frame is formed, further, with oppositely disposed notches 8, 8 adjacent the handle portion and said notches receive the arms or links 9, that are fast to a cross pin 10 that extends transversely through the handle, that carry the head or hammer 11 which is formed with a bulged free termination 12 in which the deep intersecting grooves 14 are formed, which portions, as the head 11 descends upon the knife, receive the cutting edges 15 thereof.

A pinion 16 is formed upon the cross pin 10 between the sides of the handle and the same is in mesh with a rack 17 terminally formed upon the lever 18 which is fulcrumed upon the pivot 19 carried by the handle. The lever 18 near its free end is connected by an expansion spring 20 with a pin 21 carried by the handle. In operation the potato to be cut or quartered is placed upon the knife where its blades intersect. The lever 18 is now pressed toward the handle against the tension of the spring 20 causing the head 11 to descend and force the potato against the cutting edges 15 of the knife severing it into quarters. When the lever is released the spring 20 moves it to normal position ready for the next operation.

What is claimed is:—

A potato slicer, including an annular holder for the potato or object for slicing, having crossing blades positioned within said holder, said blades having centrally depressed upper cutting edges, a pivoted plunger or head having in its face crossing slots complemental of and adapted to receive said crossing blades in the downward movement of said plunger or head, the depression formed by the depressed upper edges of said blades providing for receiving and sinking bodily of said plunger or head thereinto, whereby the potato is both sliced and the resultant slices thereof are ejected through the spaces intermediate of said blades as the plunger or head is thrust downwardly into said holder, and means for actuating said plunger or head.

In testimony that I claim the foregoing as my own I have hereto affixed my signature in the presence of two subscribing witnesses.

JENS T. TENNEFASS.

Witnesses:
S. O. WESTBERG,
BEN. O. HANSAN.

Copies of this patent may be obtained for five cents each, by addressing the "Commissioner of Patents, Washington, D. C."